United States Patent
Ahluwalia et al.

[11] Patent Number: 5,927,145
[45] Date of Patent: Jul. 27, 1999

[54] COMPACT MANUAL TRANSAXLE FOR MOTOR VEHICLES

[75] Inventors: Parvinder Ahluwalia, Manlius, N.Y.; David Brown, Hopton Diss, United Kingdom

[73] Assignee: New Venture Gear, Inc., Troy, Mich.

[21] Appl. No.: 08/905,690

[22] Filed: Aug. 4, 1997

Related U.S. Application Data

[63] Continuation-in-part of application No. 08/681,059, Jul. 22, 1996, Pat. No. 5,704,247.

[51] Int. Cl.⁶ ........................................................ F16H 3/08
[52] U.S. Cl. .................................................. 74/331; 74/329
[58] Field of Search ................................ 74/329, 331, 359

[56] References Cited

U.S. PATENT DOCUMENTS

| | | | |
|---|---|---|---|
| 4,174,644 | 11/1979 | Nagy et al. | |
| 4,463,622 | 8/1984 | Freiburger | 74/331 |
| 4,640,141 | 2/1987 | Knödel et al. | 74/357 |
| 4,738,149 | 4/1988 | Janiszewski | 74/330 |
| 4,738,150 | 4/1988 | Miner | 74/359 |
| 4,776,227 | 10/1988 | Janiszewski | 74/331 |
| 4,799,395 | 1/1989 | Janiszewski | 74/331 |
| 4,802,373 | 2/1989 | Saint-Jean et al. | 74/359 |
| 5,311,789 | 5/1994 | Henzler et al. | 74/331 |
| 5,357,821 | 10/1994 | Haka et al. | 74/335 |
| 5,385,065 | 1/1995 | Hofmann | 74/331 |
| 5,479,835 | 1/1996 | Esparsa et al. | 74/331 |
| 5,495,775 | 3/1996 | Lees et al. | 74/331 |
| 5,517,874 | 5/1996 | Janiszewski | 74/331 X |

FOREIGN PATENT DOCUMENTS

| | | |
|---|---|---|
| 0046373 | 2/1982 | European Pat. Off. |
| 0083747 | 7/1983 | European Pat. Off. |
| 2081825 | 2/1982 | United Kingdom. |
| 2172944 | 1/1986 | United Kingdom. |
| WO9210380 | 6/1992 | WIPO. |

OTHER PUBLICATIONS

"Three Shafts Instead Of Two Provide The Compact Answer", Design Engineering, Jul. 1992, p. 19.

*Primary Examiner*—Charles A Marmor
*Assistant Examiner*—Sherry Lynn Estremsky
*Attorney, Agent, or Firm*—Harness, Dickey & Pierce, P.L.C.

[57] ABSTRACT

A compact manual transmission includes an input shaft having four fixed input gears, a first intermediate shaft rotatably supporting two speed gears meshing with two of the input gears, a second intermediate shaft rotatably supporting three speed gears meshed with three of the input gears and a reverse gear meshed with a speed gear on the first intermediate shaft, and an output shaft. Two speed gears on each of the intermediate shafts meshes with common input gears. A transfer gear on each intermediate shaft is meshed with the output shaft. The transmission further includes a synchronizer clutch for establishing two forward gears by selectively coupling the two speed gears to the first intermediate shaft and a pair of synchronizer clutches for establishing three forward gears and the reverse gear by selectively coupling the three speed gears and reverse gear to the second intermediate shaft.

14 Claims, 7 Drawing Sheets

COMPACT MANUAL TRANSAXLE FOR MOTOR VEHICLES

CROSS REFERENCE TO RELATED APPLICATION

This application is a continuation-in-part of U.S. application Ser. No. 08/681,059, filed Jul. 22, 1996, now U. S. Pat. No. 5,704,247.

BACKGROUND OF THE INVENTION

This invention relates generally to manual multi-speed transmissions of the type used in motor vehicles. More specifically, the present invention is directed to a compact manual transaxle having a synchronized reverse gear.

Due to increasing consumer demand for front wheel drive vehicles with more powerful yet fuel-efficient drivetrains, the engine and transaxle must be efficiently packaged to take advantage of all available space within the engine compartment. Concomitantly, most modern transaxles must be capable of providing at least forward five speed ratios. As such, minimizing the overall axial length of the transaxle as well as its shaft center distances is of critical importance to the transmission designer. To meet these requirements, various "three-shaft" type transaxle have been developed. For example, U.S. Pat. No. 4,738,150 discloses a five-speed manual transaxle having an input shaft and a pair of countershafts both of which drive a differential which, in turn, drives a pair of axle half-shafts. Gearsets on both countershafts can be selectively engaged to deliver power from the input shaft to the axle half-shafts. Furthermore, U.S. Pat. Nos. 5,385,065 and 5,495,775 disclose five-speed transaxles having a synchronized reverse gear arrangement.

Accordingly, while such conventional manual transaxle designs attempt to address the packaging requirements mentioned above, a need still exists for development of more compact and robust manual transaxles that can meet the demands of modern front wheel drive vehicular applications.

SUMMARY OF THE INVENTION

The primary object of the present invention is to provide a multi-speed manual transaxle that meets the above-noted needs and improves upon conventional designs.

Accordingly, the present invention is directed to a five-speed manual transaxle comprised of an input shaft, an output shaft, first and second intermediate shafts driving said output shaft, first and second input gears fixed to said input shaft, first and second speed gears rotatably supported on said first intermediate shaft and respectively meshed with said first and second input gears, a first clutch for selectively coupling either of said first and second speed gears to said first intermediate shaft, a third input gear fixed to said input shaft, a third speed gear rotatably supported on said second intermediate shaft and meshed with said third input gear, a reverse gear rotatably supported on said second intermediate shaft and meshed with said first speed gear, and a second clutch for selectively coupling either of said third speed gear and said reverse gear to said second intermediate shaft.

The present invention is also directed to a five-speed manual transaxle comprised of an input shaft, an output shaft, first and second intermediate shafts driving said output shaft, first and second input gears fixed to said input shaft, first and second speed gears rotatably supported on said first intermediate shaft and respectively meshed with said first and second input gears, a first clutch for selectively coupling either of said first and second speed gears to said first intermediate shaft, a third speed gear rotatably supported on said second intermediate shaft and meshed with said second input gear, a reverse gear rotatably supported on said second intermediate shaft and meshed with said first speed gear, and a second clutch selectively coupling either of said third speed gear and said reverse gear to said second intermediate shaft.

Additionally, the present invention is directed to a six-speed manual transaxle comprised of an input shaft, an output shaft, a first intermediate shaft driving said output shaft, a first input fear fixed to said input shaft, a first speed gear rotatably supported on said first intermediate shaft and meshed with said first input gear, a second input gear fixed to said input shaft, a second speed gear rotatably supported on said first intermediate shaft and meshed with said second input gear, a first clutch for selectively coupling either of said first and second speed gears to said first intermediate shaft, a third input gear fixed to said input shaft, a third speed gear rotatably supported on said first intermediate shaft and meshed with said third input gear, a fourth input gear fixed to said input shaft, a fourth speed gear rotatably supported on said first intermediate shaft and meshed with said fourth input gear, a second clutch for selectively coupling either of said third and fourth speed gears to said first intermediate shaft, a second intermediate shaft driving said output shaft, a fifth speed gear rotatably supported on said second intermediate shaft and meshed with said third input gear, a sixth speed gear rotatably supported on said second intermediate shaft and meshed with said fourth input gear, a third clutch for selectively coupling either of said fifth and sixth speed gears to said second intermediate shaft, a reverse gear rotatably supported on said second intermediate shaft and meshed with said first speed gear, and a fourth clutch for selectively coupling said reverse gear to said second intermediate shaft.

BRIEF DESCRIPTION OF THE DRAWINGS

Further objects, features and advantages of the present invention will become apparent to those skilled in the art from studying the following description and the accompanying drawings in which.

DETAILED DESCRIPTION OF THE PREFERRED EMBODIMENT

Figure 1:
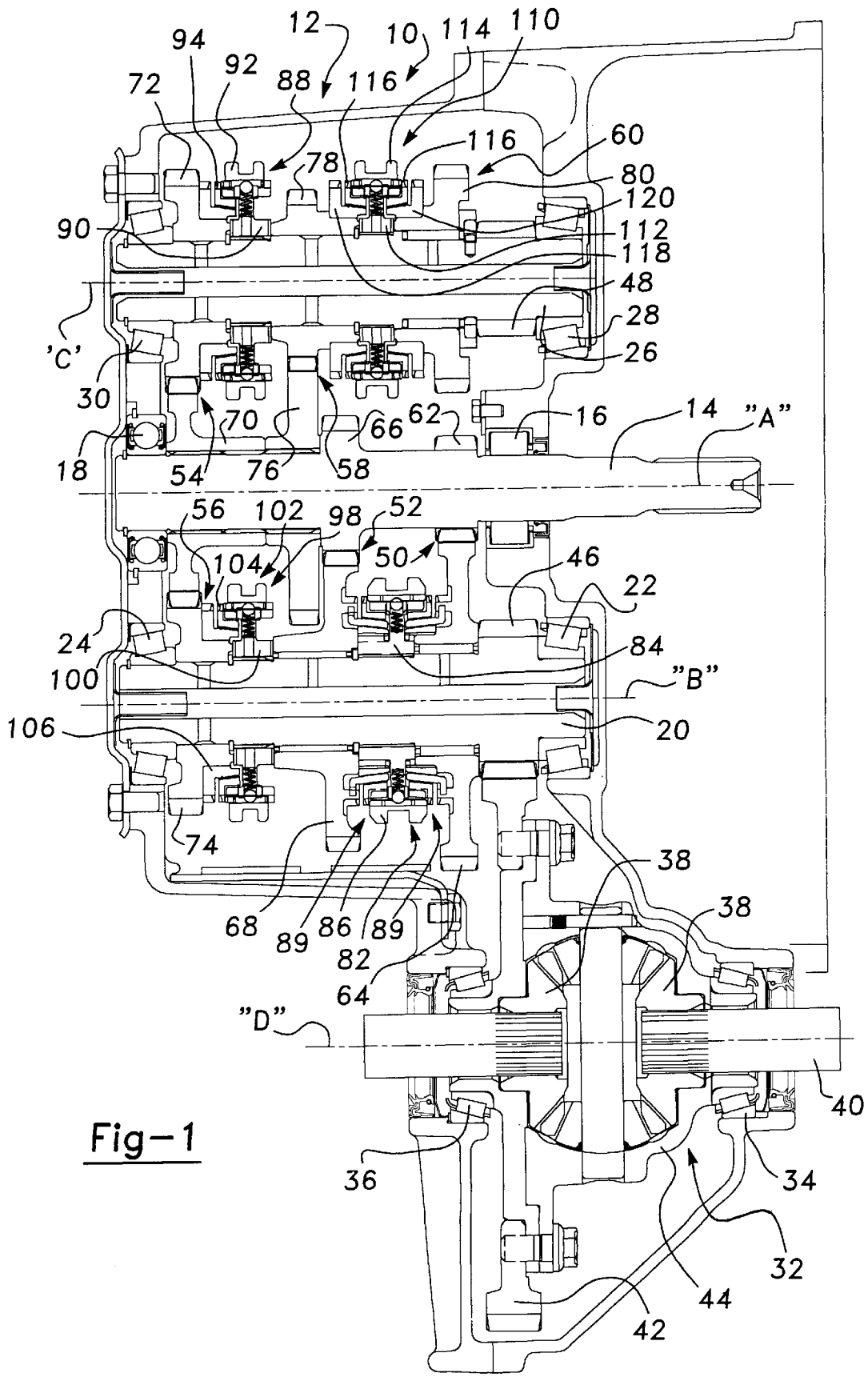
FIG. 1 is a sectional view of a five-speed manual transaxle constructed according to a preferred embodiment of the present invention.
Figure 2:
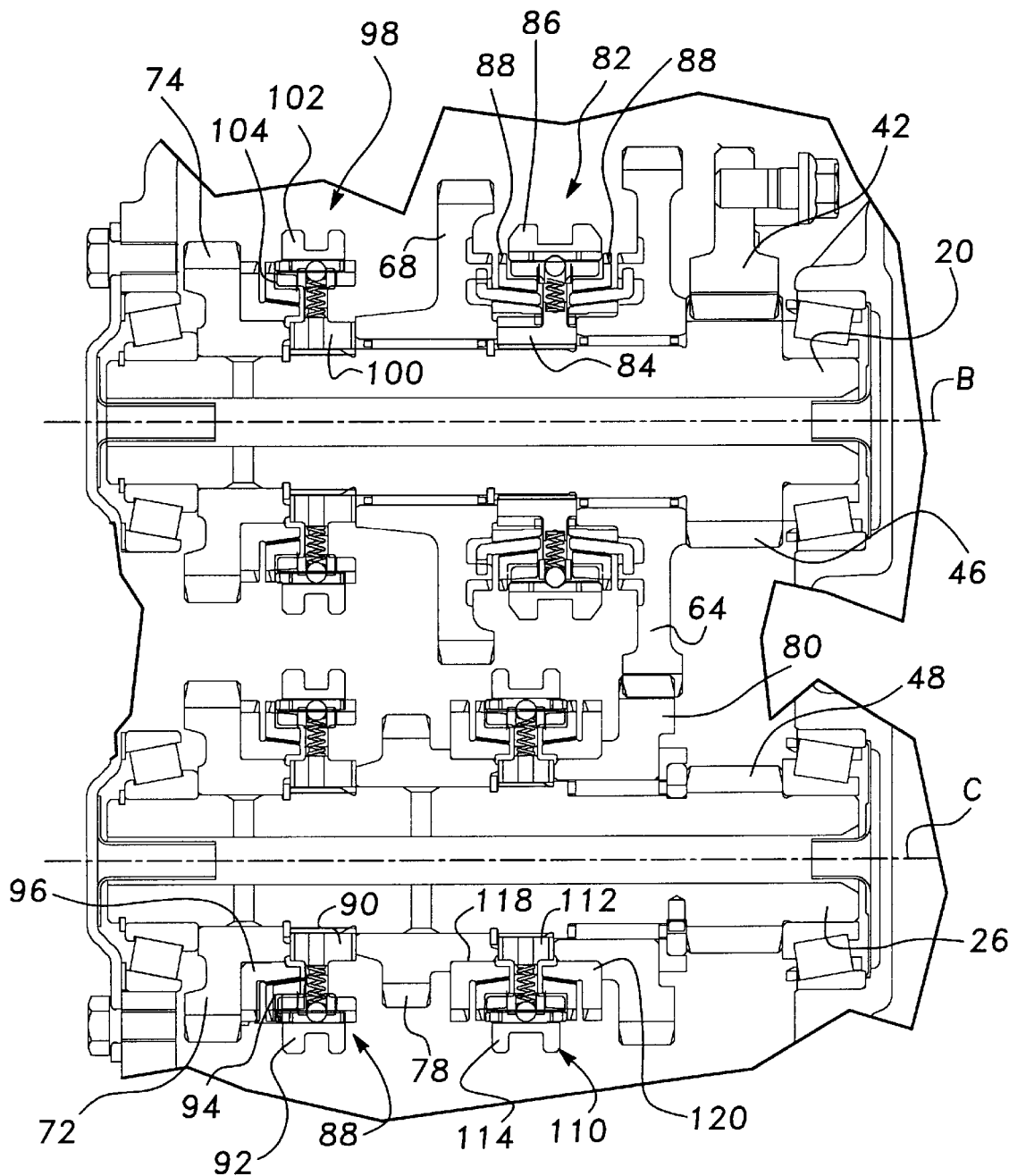
FIG. 2 is a partial sectional view of the five-speed manual transaxle shown in FIG. 1.

Referring now to the drawings, a manual transaxle 10 is shown that is adapted for use in front wheel drive motor vehicles. Transaxle 10 is a five-speed arrangement having all of its forward and reverse gears synchronized and yet is efficiently packaged to provide a compact gearbox.

Figure 3:
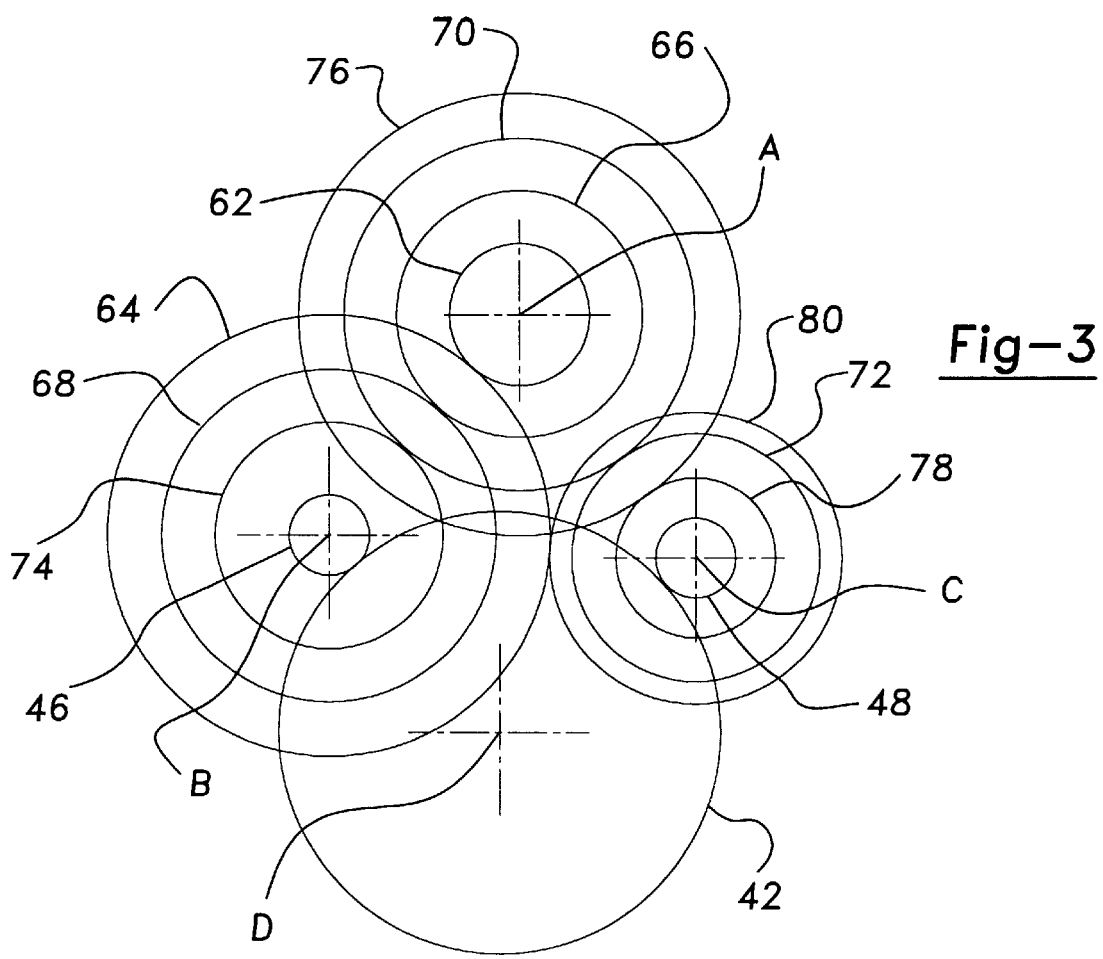
FIG. 3 is a schematic view showing the shaft and gear arrangement of the transmission shown in FIG. 1.

With particular reference to FIG. 1, transaxle 10 is shown to include a housing 12 within which an input shaft 14 is rotatably supported by bearings 16 and 18 for rotation about a first axis "A". As is conventional, input shaft 14 is adapted to be driven through a suitable manually-released clutch (not shown) by the vehicles's engine. Transaxle 10 is also shown to include a first driven or intermediate shaft 20 rotatably supported in housing 12 by bearings 22 and 24 for rotation about second axis "B", a second driven or intermediate shaft 26 rotatably supported in housing 12 by bearings 28 and 30 for rotation about a third axis "C", and a differential 32 supported in housing 12 by bearings 34 and 36 for rotation about a fourth axis "D". As is also conventional, the output of differential 32 includes a pair of axially-aligned side gears 38 to which axle half-shafts 40 are fixed so as to connect differential 32 to the driving wheels of the motor vehicle. The input to differential 32 is a final drive gear 42 fixed to differential cage 44 and which is in constant meshed engagement with a first transfer gear 46 fixed to first intermediate shaft 20 as well as with a second transfer gear 48 fixed to second intermediate shaft 26. It will be appreciated that FIG. 1 is a so-called "unrolled" sectional view wherein shafts 14, 20, 26 and 40 are all arranged in a single plane. However, in reality, these shafts are compactly arranged in a parallel relationship relative to each other, with no three shafts aligned in a common plane, as is shown in FIG. 3. In this manner, the center distances between the shafts can be effectively minimized.

Transaxle 10 includes a series of constant-mesh gearsets 50, 52, 54, 56, 58 and 60 that can be selectively engaged for establishing five forward speed ratios as well as a reverse speed ratio between input shaft 14 and final drive gear 42. Gearset 50 includes a first input gear 62 fixed to input shaft 14 and a first speed gear 64 rotatably supported on first intermediate shaft 20. First speed gear 64 is in constant mesh with first input gear 62 for defining a first power transmission path that can be selectively engaged to establish a first forward speed ratio. Gearset 52 includes a second input gear 66 fixed to input shaft 14 that is in constant mesh with a second speed gear 68 rotatably supported on first intermediate shaft 20. Thus, gearset 52 functions to define a second power transmission path that can be selectively engaged to establish a second forward speed ratio. Gearset 54 includes a third input gear 70 fixed to input shaft 14 that is in constant mesh with a third speed gear 72 rotatably supported on second intermediate shaft 26. As such, gearset 54 functions to define a third power transmission path that can be selectively engaged to establish a third forward speed ratio. Gearset 56 includes a fourth speed gear 74 rotatably supported on first intermediate shaft 20 that is also in constant mesh with third input gear 70. Thus, gearset 56 functions to define a fourth power transmission path that can be selectively engaged to establish a fourth forward speed ratio. Gearset 58 includes a fourth input gear 76 fixed to input shaft 14 that is in constant mesh with a fifth speed gear 78 rotatably supported on second intermediate shaft 26. Gearset 56 functions to define a fifth power transmission path that can be selectively engaged to establish a fifth forward speed ratio. Finally, gearset 60 includes a reverse gear 80 rotatably supported on second intermediate shaft 26 that is in constant mesh with first speed gear 64. As such, gearset 60 defines a sixth power transmission path that can be selectively engaged to establish the reverse speed ratio.

To provide means for establishing the various forward and reverse speed ratios by selectively engaging one of the available power transmission paths, each gearset is associated with a synchronizer clutch. In particular, a first synchronizer clutch 82 is operably located between first and second speed gears 64 and 68 and includes a hub 84 fixed to first intermediate shaft 20, a shift sleeve 86 mounted for rotation with and axial sliding movement on hub 84, and a pair of suitable blocker-type synchronizers 89 interposed between shift sleeve 86 and speed gears 64 and 68. First synchronizer clutch 82 is of the double-acting variety such that forward axial movement of shift sleeve 86 from its centered neutral position shown is adapted to couple first speed gear 64 to first intermediate shaft 20 for establishing the first forward speed ratio in which first transfer gear 46 drives final drive gear 42. Moreover, rearward axial movement of shift sleeve 86 from its neutral position is adapted to couple second speed gear 68 to first intermediate shaft 20 such that first transfer gear 46 drives final drive gear 42 at the second forward speed ratio.

To establish the third forward speed ratio, a second synchronizer clutch 88 is located adjacent to third speed gear 72 and includes a hub 90 fixed to second intermediate shaft 26, a shift sleeve 92 mounted for rotation with and axial sliding movement on hub 90, and a blocker-type synchronizer 94 interposed between shift sleeve 92 and a clutch gear 96 fixed to third speed gear 72. Second synchronizer clutch 88 is of the single-acting type such that rearward movement of shift sleeve 92 from its centered neutral position shown is adapted to couple third speed gear 72 to second intermediate shaft 26 such that second transfer gear 48 drives final drive gear 42 at the third speed ratio.

To establish the fourth speed ratio, a third synchronizer clutch 98 is located adjacent to fourth speed gear 74 and includes a hub 100 fixed to first intermediate shaft 20, a shift sleeve 102 mounted for rotation with and axially sliding movement on hub 100, and a blocker-type synchronizer 104 interposed between shift sleeve 102 and a clutch gear 106 fixed to fourth speed gear 74. Rearward sliding movement of shift sleeve 102 from its centered neutral position shown causes it to couple fourth speed gear 74 to first intermediate shaft 20 such that first transfer gear 46 drives final drive gear 42 at the fourth forward speed ratio.

The fifth forward speed ratio and the reverse speed ratio are established via a fourth synchronizer clutch 110, also of the double-acting variety, that is located between fifth speed gear 78 and reverse gear 80. Fourth synchronizer clutch 110 includes a hub 112 fixed to second intermediate shaft 26, a shift sleeve 114 mounted for rotation with and axial sliding movement on hub 112, and a pair of blocker-type synchronizers 116 interposed between shift sleeve 114 and gears 78 and 80. Rearward sliding movement of shift sleeve 114 from its centered neutral position shown is adapted to couple a clutch gear 118 fixed to fifth speed gear 78 to second intermediate shaft 26 such that second transfer gear 48 drives final drive gear 42 at the fifth speed ratio. In contrast, forward sliding movement of shift sleeve 114 from its neutral position couples it to a clutch gear 120 fixed to reverse gear 80 such that reverse gear 80 is releasably coupled to second intermediate shaft 26. As such, second transfer gear 48 drives final drive gear 42 at the reverse speed ratio and in the opposite direction with respect to the normal direction of rotation of final drive gear 42 during forward operation. This reversal of direction results from reverse gear 80 being driven by first speed gear 64 which, in turn, is driven by first input gear 62.

In the first forward gear, torque is delivered from input shaft 14 to differential 32 through elements 62, 64, 86, 84, 20, 46 and 42. In the second forward gear, torque is delivered from input shaft 14 to differential 32 through elements 66, 68, 86, 84, 20, 46 and 42. In the third forward gear, torque is delivered from input shaft 14 to differential 32 through elements 70, 72, 92, 90, 26, 48 and 42. In the fourth forward gear, torque is delivered from input shaft 14 to differential 32 through elements 70, 74, 102, 100, 20, 46 and 42. In the fifth forward gear, torque is delivered from input shaft 14 to differential 32 through elements 76, 78, 114, 112, 26, 48 and 42. Finally, in the reverse gear, torque is delivered from input shaft 14 to differential 32 through elements 62, 64, 80, 114, 112, 26, 48, and 42. In the presently preferred embodiment, speed gears 72 and 74 are identical and transfer gears 46 and 48 have differing numbers of teeth.

Figure 4:
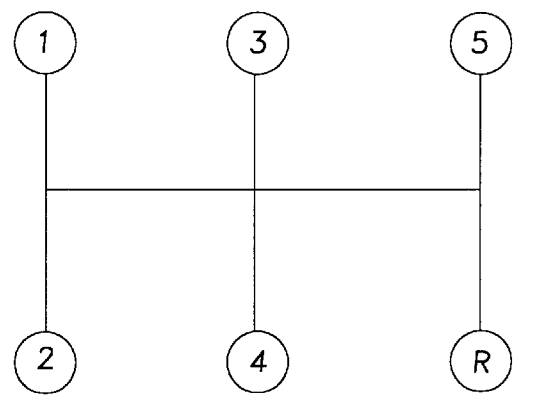
FIG. 4 is a shift gate diagram for the transaxle shown in FIG. 1.

FIG. 3 is a schematic illustration of the arrangement of shafts 14, 20, 26 and 40 and of the meshing of the various gearsets. In addition, a shift pattern or gate diagram for transaxle 10 is shown in FIG. 4. Obviously, any suitable shift system coupling each of shift sleeves 86, 42, 102 and 114 to a gearshift lever (not shown) for coordinated movement to establish the various forward and reverse gears can be used with transaxle 10.

Figure 5:
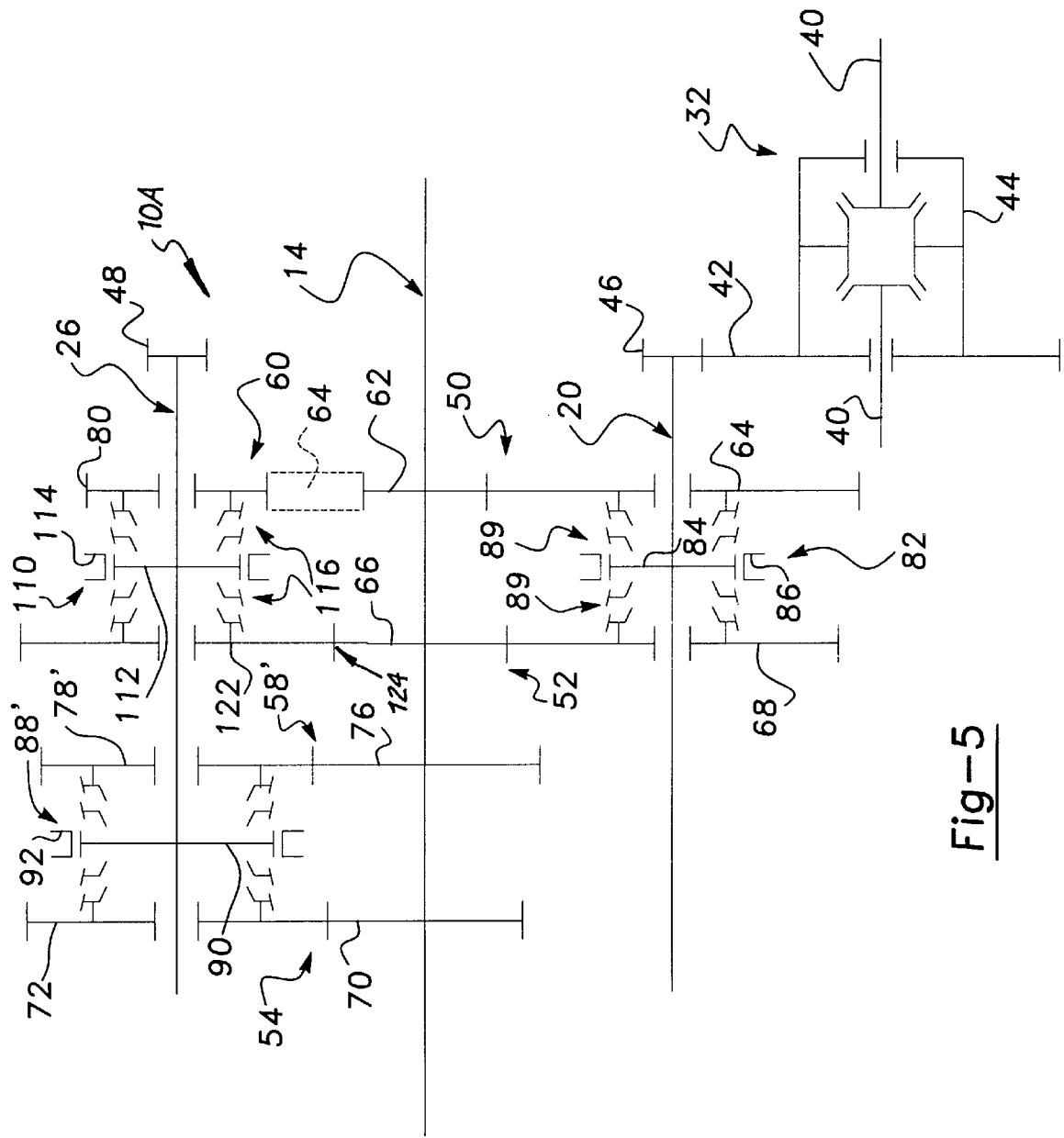
FIG. 5 is a schematic view of a five-speed manual transaxle constructed according to an alternative preferred embodiment of the present invention.
Figure 6:
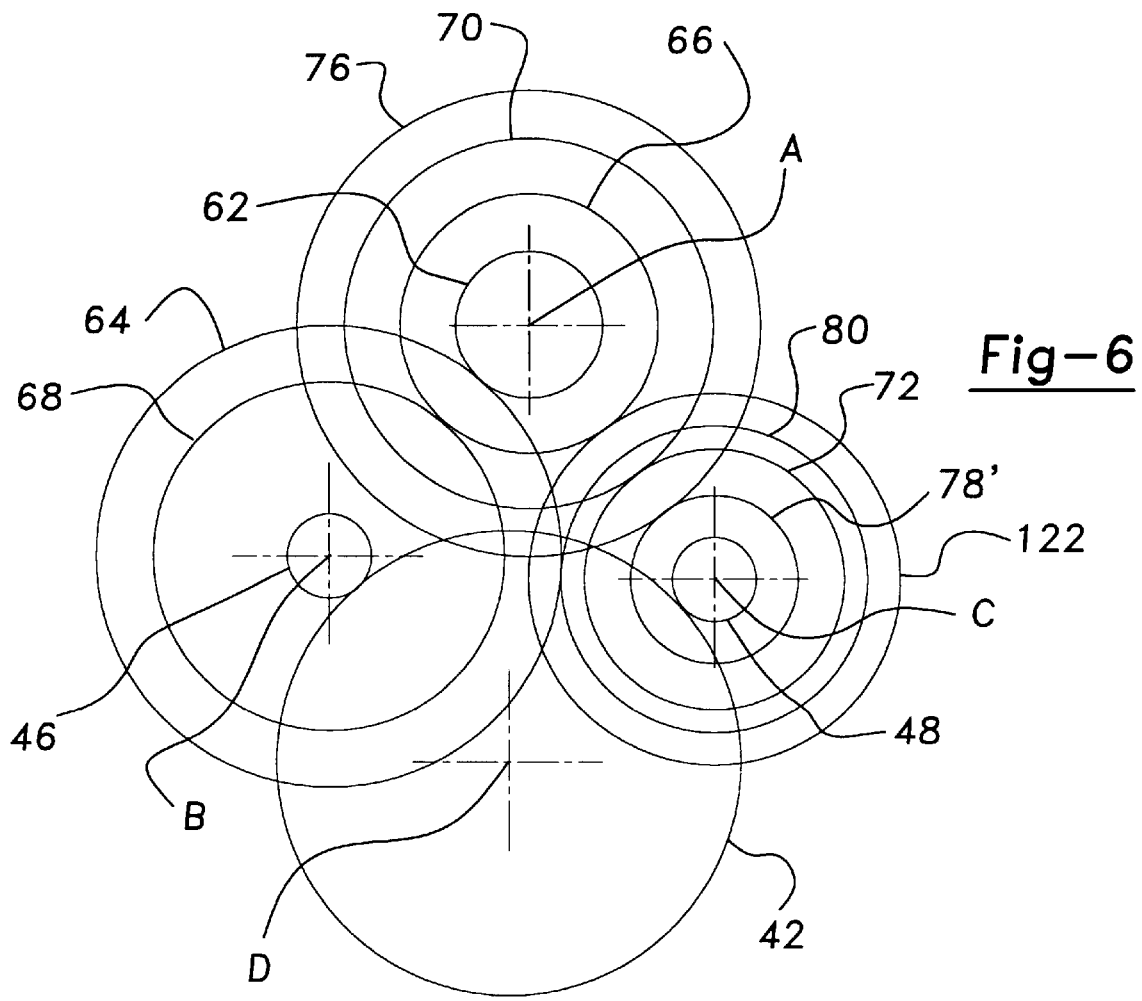
FIG. 6 is a schematic view showing the shaft and gear arrangement for the transaxle shown in FIG. 5.

With particular reference to FIGS. 5 and 6, the geartrain for a five-speed transaxle 10A is schematically shown which is a modified version of transaxle 10 described previously with respect to FIGS. 1 through 4. As such, the common elements are hereinafter designated by like reference numerals with those elements modified being identified with a primed reference numeral. In direct comparison, transaxle 10A is different in that speed gear 74 and synchronizer clutch 98 have been eliminated, speed gear 78' is now associated with synchronizer clutch 88', and a new speed gear 122 has been added. Speed gear 122 is rotatably supported on second intermediate shaft 26 and is in constant mesh with second speed gear 66 to define a constant-mesh gearset 124. In this particular embodiment, gearsets 50 and 52 again function to define first and second power transmission paths which can be selectively engaged via actuation of synchronizer clutch 82 to establish first and second forward speed ratios. In addition, gearsets 54 and 58' function to define third and fourth power transmission paths which can be selectively engaged via actuation of synchronizer clutch 88' to establish third and fourth forward speed ratios. Furthermore, gearset 124 functions to define a fifth power transmission path which can be selectively engaged via synchronizer clutch 110 to establish a fifth forward speed ratio. Finally, gearset 60 defines a sixth power transmission path which can be selectively engaged via synchronizer clutch 110 to establish the reverse speed ratio.

In the first forward speed ratio, torque is delivered from input shaft 14 to differential 32 through elements 62, 64, 86, 84, 20, 46 and 42. In the second forward speed ratio, torque is delivered from input shaft 14 to differential 32 through elements 66, 68, 86, 84, 20, 46 and 42. In the third forward speed ratio, torque is delivered from input shaft 14 to differential 32 through elements 70, 72, 92, 90, 26, 48 and 42. In the fourth forward gear, torque is delivered from input shaft 14 to differential 32 through elements 76, 78', 92, 90, 26, 48 and 42. In the fifth forward speed ratio, torque is delivered from input shaft 14 to differential 32 through elements 66, 122, 114, 112, 26, 48 and 42. Finally, in the reverse gear, torque is delivered from input shaft 14 to differential 32 through elements 62, 64, 80, 114, 112, 26, 48 and 42.

Figure 7:
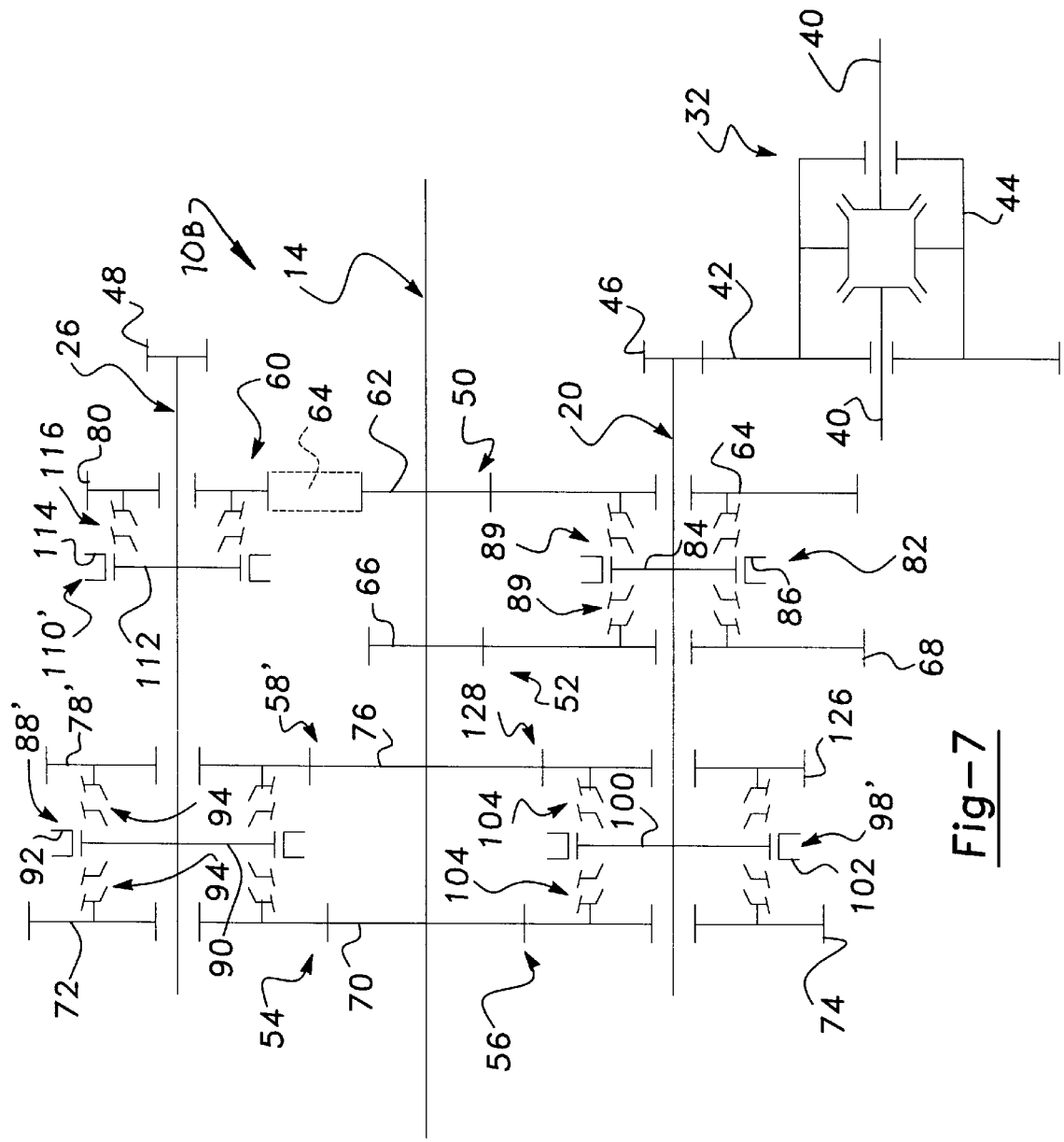
FIG. 7 is a schematic view of a six-speed manual transaxle constructed according to yet another preferred embodiment of the present invention.
Figure 8:
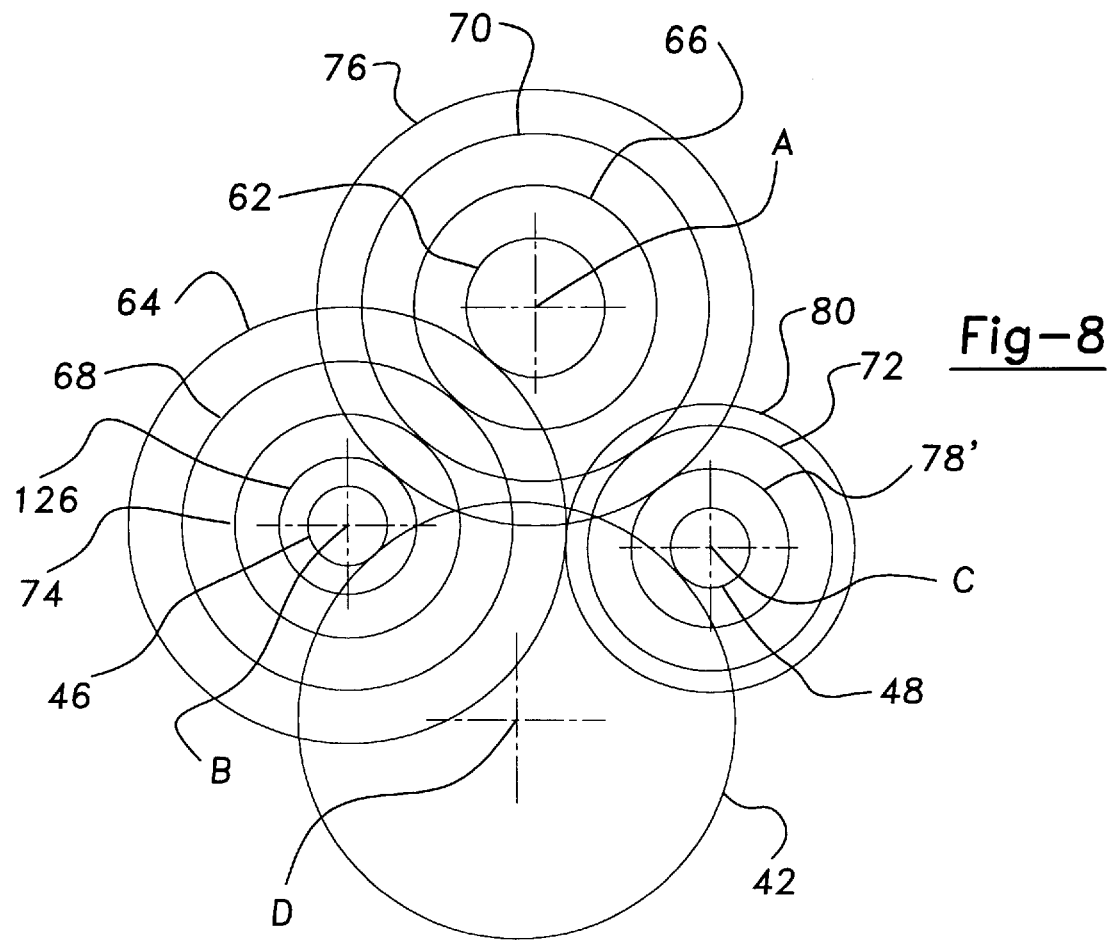
FIG. 8 is a schematic view of the shaft and gear arrangement for the transaxle shown in FIG. 7.

With reference now to FIGS. 7 and 8, the geartrain for a six-speed transaxle 10B is schematically shown which is a modified version of transaxles 10 and 10A. Again, common elements are identified by like numbers while modified elements are identified by a primed reference numeral. In particular, transaxle 10B is different with respect to transaxle 10 in that speed gear 78' is associated with synchronizer clutch 88', speed gear 126 has been added, and synchronizer clutch 98' is now of the double-acting variety. Speed gear 126 is rotatably supported on first intermediate shaft 20 and is in constant mesh with fourth input gear 76 to define a constant-mesh gearset 128. Thus, gearsets 50 and 52 function to define first and second power transmission paths which can be selectively engaged via synchronizer clutch 82 to establish first and second forward gear ratios. Gearsets 54 and 58' function to define third and fourth power transmission paths which can be selectively engaged via synchronizer clutch 88' to establish third and fourth forward speed ratios. Additionally, gearsets 56 and 128 function to define fifth and sixth power transmission paths which can be selectively engaged via synchronizer clutch 98' to establish fifth and sixth forward speed ratios. Finally, gearset 60 defines a seventh power transmission path which can be selectively engaged via synchronizer clutch 110' to establish the reverse speed ratios.

In the first forward speed ratios, torque is delivered from input shaft 14 to differential 32 through elements 62, 64, 86, 84, 20, 46 and 42. In the second forward speed ratio, torque is delivered through elements 66, 68, 86, 84, 20, 46 and 42. In the third forward speed ratio, torque is delivered through elements 70, 72, 92, 90, 26, 48 and 42. In the fourth forward speed ratio, torque is delivered through elements 76, 78', 92, 90, 26, 48 and 42. In the fifth forward speed ratio, torque is delivered through elements 70, 74, 102, 100, 20, 46 and 42. In the sixth forward speed ratio, torque is delivered through elements 76, 126, 102, 100, 20, 46 and 42. Finally, in the reverse gear, torque is delivered through elements 62, 64, 80, 114, 112, 26, 48 and 42. Depending on the particular gear geometry (i.e., number of gear teeth, etc.) for each of gearsets 50, 52, 54, 56, 58' and 128', the sequence of engagement thereof via actuation of the corresponding synchronizer clutches can be arranged in any order to provide the desired sequence of speed ratios. Moreover, the gear geometry may be selected such that transaxle 10B provides at least one overdrive speed ratio.

Figure 9:
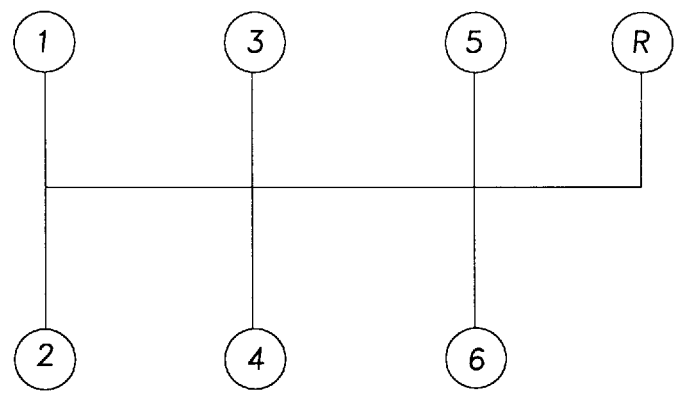
FIG. 9 is a shift gate diagram for the transaxle shown in FIG. 7.

FIG. 9 illustrates an exemplary shift gate pattern providing six forward gears and a reverse gear.

The foregoing discussion discloses and describes preferred embodiments of the present invention. One skilled in the art will readily recognize from such discussion, and from the accompanying drawings and claims, that various changes, modifications and variations can be made therein without departing from the true spirit and fair scope of the invention as defined in the following claims.

What is claimed is:

1. A manual transmission comprising:

an input shaft;

an output shaft;

a first intermediate shaft driving said output shaft;

a second intermediate shaft driving said output shaft;

a first constant-mesh gearset supported between said input shaft and said first intermediate shaft and including a first input gear fixed to said input shaft which is meshed with a first speed gear rotatably supported on said first intermediate shaft;

a second constant-mesh gearset supported between said input shaft and said first intermediate shaft;

a first clutch for selectively engaging either of said first and second gearsets for driveably connecting said first intermediate shaft to said input shaft for establishing first and second forward speed ratios;

a third constant-mesh gearset supported between said input shaft and said second intermediate shaft;

a fourth constant-mesh gearset supported between said first and second intermediate shafts and including a reverse gear rotatably supported on said second intermediate shaft which is meshed with said first speed gear;

a second clutch for selectively engaging either of said third and fourth gearsets for drivingly connecting said second intermediate shaft to said input shaft for establishing a third forward speed ratio and a reverse speed ratio;

fifth and sixth constant-mesh gearsets supported between said input shaft and said second intermediate shaft; and a third clutch for selectively engaging either of said fifth and sixth gearsets for driveably connecting said second intermediate shaft to said input shaft for establishing fourth and fifth forward speed ratios.

2. The manual transmission of claim 1 wherein said output shaft includes a pair of axle shafts driven by a differential driven by said first and second intermediate shafts.

3. A manual transmission comprising:

an input shaft;

an output shaft;

first and second intermediate shafts driving said output shaft;

first and second input gears fixed to said input shaft;

first and second speed gears rotatably supported on said first intermediate shaft and respectively meshed with said first and second input gears;

a first clutch for selectively coupling either of said first and second speed gears to said first intermediate shaft;

a third input gear fixed to said input shaft;

a third speed gear rotatably supported on said second intermediate shaft and meshed with said third input gear;

a reverse gear rotatably supported on said second intermediate shaft and meshed with said first speed gear;

a second clutch for selectively coupling either of said third speed gear and said reverse gear to said second intermediate shaft;

a fourth input gear fixed to said input shaft;

a fourth speed gear rotatable supported on said first intermediate shaft and meshed with said fourth input gear;

a third clutch for selectively coupling said fourth speed gear to said first intermediate shaft;

a fifth speed gear rotatably supported on said second intermediate shaft and meshed with said fourth input gear; and a fourth clutch for selectively coupling said fifth speed gear to said second intermediate shaft.

4. The manual transmission of claim 3 wherein said output shaft includes a pair of axle shafts driven by a differential driven by said first and second intermediate shafts.

5. A manual transmission comprising:

an input shaft;

an output shaft;

first and second intermediate shafts driving said output shaft;

first and second input gears fixed to said input shaft;

first and second speed gears rotatably supported on said first intermediate shaft and respectively meshed with said first and second input gears;

a first clutch for selectively coupling either of said first and second speed gears to said first intermediate shaft;

a third speed gear rotatably supported on said second intermediate shaft and meshed with said second input gear;

a reverse gear rotatably supported on said second intermediate shaft and meshed with said first speed gear; and a second clutch for selectively coupling either of said third speed gear and said reverse gear to said second intermediate shaft.

6. The manual transmission of claim 5 further comprising:

third and fourth input gears fixed to said input shaft;

fourth and fifth speed gears rotatably supported on said second intermediate shaft and respectively meshed with said third and fourth input gears; and a third clutch for selectively coupling either of said fourth and fifth speed gears to said second intermediate shaft.

7. The manual transmission of claim 5 wherein said output shaft includes a pair of axle shafts driven by a differential selectively driven by said first and second intermediate shafts.

8. A manual transmission comprising:

an input shaft;

an output shaft;

a first intermediate shaft driving said output shaft;

a second intermediate shaft driving said output shaft;

a first constant-mesh gearset supported between said input shaft and said first intermediate shaft and including a first input gear fixed to said input shaft which is meshed with a first speed gear rotatably supported on said first intermediate shaft;

a second constant-mesh gearset supported between said input shaft and said first intermediate shaft and including a second input gear fixed to said input shaft which is meshed with a second speed gear rotatably supported on said first intermediate shaft;

a first clutch for, selectively engaging either of said first and second gearsets for connecting said first intermediate shaft to said input shaft for establishing first and second forward speed ratios;

a third constant-mesh gearset supported between said input shaft and said second intermediate shaft and including a third speed gear rotatably supported on said second intermediate shaft which is meshed with said second input gear;

a fourth constant-mesh gearset supported between said first and second intermediate shafts and including a reverse gear rotatably supported on said second intermediate shaft which is meshed with said first speed gear; and a second clutch for selectively engaging either of said third and fourth gearsets for connecting said second intermediate shaft to said input shaft for establishing a third forward speed ratio and a reverse speed ratio.

9. The manual transmission of claim 8 further comprising a differential driven by said first and second intermediate shafts, and wherein said output shaft includes a pair of axle shafts driven by said differential.

10. A manual transmission comprising:

an input shaft;

an output shaft;

a first intermediate shaft driving said output shaft;

a second intermediate shaft driving said output shaft;

a first constant-mesh gearset supported between said input shaft and said first intermediate shaft and including a first input gear fixed to said input shaft which is meshed with a first speed gear rotatably supported on said first intermediate shaft;

a second constant-mesh gearset supported between said input shaft and said first intermediate shaft and including a second input gear fixed to said input shaft which is meshed with a second speed gear rotatably supported on said first intermediate shaft;

a first clutch for selectively engaging either of said first and second gearsets for connecting said first intermediate shaft to said input shaft for establishing first and second forward speed ratios;

a third constant-mesh gearset supported between said input shaft and said second intermediate shaft and including a third input gear fixed to said input shaft which is meshed with a third speed gear rotatably supported on said second intermediate shaft;

a fourth constant-mesh gearset supported between said input shaft and said second intermediate shaft and including a reverse gear rotatably supported on said second intermediate shaft which is meshed with said first speed gear;

a second clutch for selectively engaging either of said third and fourth gearsets for drivingly connecting said second intermediate shaft to said input shaft for establishing a third forward speed ratio and a reverse speed ratio;

a fifth constant-mesh gearset supported between said input shaft and said first intermediate shaft;

a third clutch for selectively engaging said fifth gearset for drivingly connecting said first intermediate shaft to said input shaft for establishing a fourth forward speed ratio;

a sixth constant-mesh gearset supported between said input shaft and said second intermediate shaft; and a fourth clutch for selectively engaging said sixth gearset for drivingly connecting said second intermediate shaft to said input shaft for establishing a fifth forward speed ratio.

11. The manual transmission of claim 10 wherein said fifth constant-mesh gearset includes a fourth input gear fixed to said input shaft and meshed with a fourth speed gear rotatably supported on said first intermediate shaft, and wherein said sixth constant-mesh gearset includes a fifth speed gear rotatably supported on said second intermediate shaft and meshed with said fourth input gear.

12. The manual transmission of claim 10 further comprising a differential driven by said first and second intermediate shafts, and wherein said output shaft includes a pair of axle shafts driven by said differential.

13. A manual transmission comprising:

an input shaft;

an output shaft;

first and second intermediate shafts driving said output shaft;

first, second, third and fourth input gears fixed to said input shaft;

first and second speed gears rotatably supported on said first intermediate shaft and respectively meshed with said first and second input gears;

a first clutch for selectively coupling either of said first and second speed gears to said first intermediate shaft;

a third speed gear rotatably supported on said second intermediate shaft and meshed with said third input gear;

a reverse gear rotatably supported on said second intermediate shaft and meshed with said first speed gear;

a second clutch for selectively coupling either of said third speed gear and said reverse gear to said second intermediate shaft;

a fourth speed gear rotatably supported on said first intermediate shaft and meshed with said fourth input gear;

a third clutch for selectively coupling said fourth speed gear to said first intermediate shaft;

a fifth speed gear rotatably supported on said second intermediate shaft and meshed with said fourth input gear; and a fourth clutch for selectively coupling said fifth speed gear to said second intermediate shaft.

14. The manual transmission of claim 13 further comprising a differential driven by said first and second intermediate shafts, and wherein said output shaft includes a pair of axle shafts driven by said differential.

\* \* \* \* \*

UNITED STATES PATENT AND TRADEMARK OFFICE
CERTIFICATE OF CORRECTION

PATENT NO. : 5,927,145
DATED : July 27, 1999
INVENTOR(S) : Parvinder Ahluwalia, David Brown It is certified that error appears in the above-identified patent and that said Letters Patent is hereby corrected as shown below:

Columns 1 and 2, "said" should be --the--.

Column 6, line 41, after "ratio." insert --Finally,--.

Column 6, line 42, NO NEW PARAGRAPH.

Column 6, line 43, after "reverse gear" delete "." and insert --gear for transaxle 10B--.

Column 7, line 48, claim 3, "rotatable" should be --rotatably--.

Column 8, line 45, claim 8, after "for" delete --,--.

Signed and Sealed this

Thirtieth Day of January, 2001

*Attest:*

Q. TODD DICKINSON

*Attesting Officer*    *Director of Patents and Trademarks*